United States Patent

Silverman

[15] 3,654,625

[45] Apr. 4, 1972

[54] RAPID SEQUENTIAL INFORMATION RECORD, STORAGE AND PLAYBACK SYSTEM

[72] Inventor: Ralph Silverman, 4326 Larchwood Avenue, Philadelphia, Pa. 19104

[22] Filed: Aug. 6, 1969

[21] Appl. No.: 848,004

[52] U.S. Cl. ....................................340/173 R, 340/174.1 R

[51] Int. Cl. .......................................G11c 7/00, G11b 19/02

[58] Field of Search ..................340/173 R, 174 SR, 174.1 R; 307/221

[56] References Cited

UNITED STATES PATENTS 3,117,307 1/1964 Davie ................................340/173 R 3,493,939 2/1970 Dunn et al.........................340/173 R

*Primary Examiner*—Stanley M. Urynowicz, Jr.

*Attorney*—Polachek, Saulsbury & Hough

[57] ABSTRACT

A rapid sequential information record, storage and playback system has no moving parts aside from electronically active non-mechanical electronic switches. The system may serve as a secondary memory and conclusion writing or readout system for digital computers. Translations occur between physically sequential and temporarily sequential sets of signals. Translation is accomplished by passage of an electric current through a series of electronic switches located in pairs of record and playback modules to change the electronic configurations of the electronic switches. In playback the modules that contain information are not emptied of information. Systems described employ record and playback modules operated in succession with or without feed back of signals to trigger successive operation in record and playback modes.

8 Claims, 2 Drawing Figures

Figure 1:
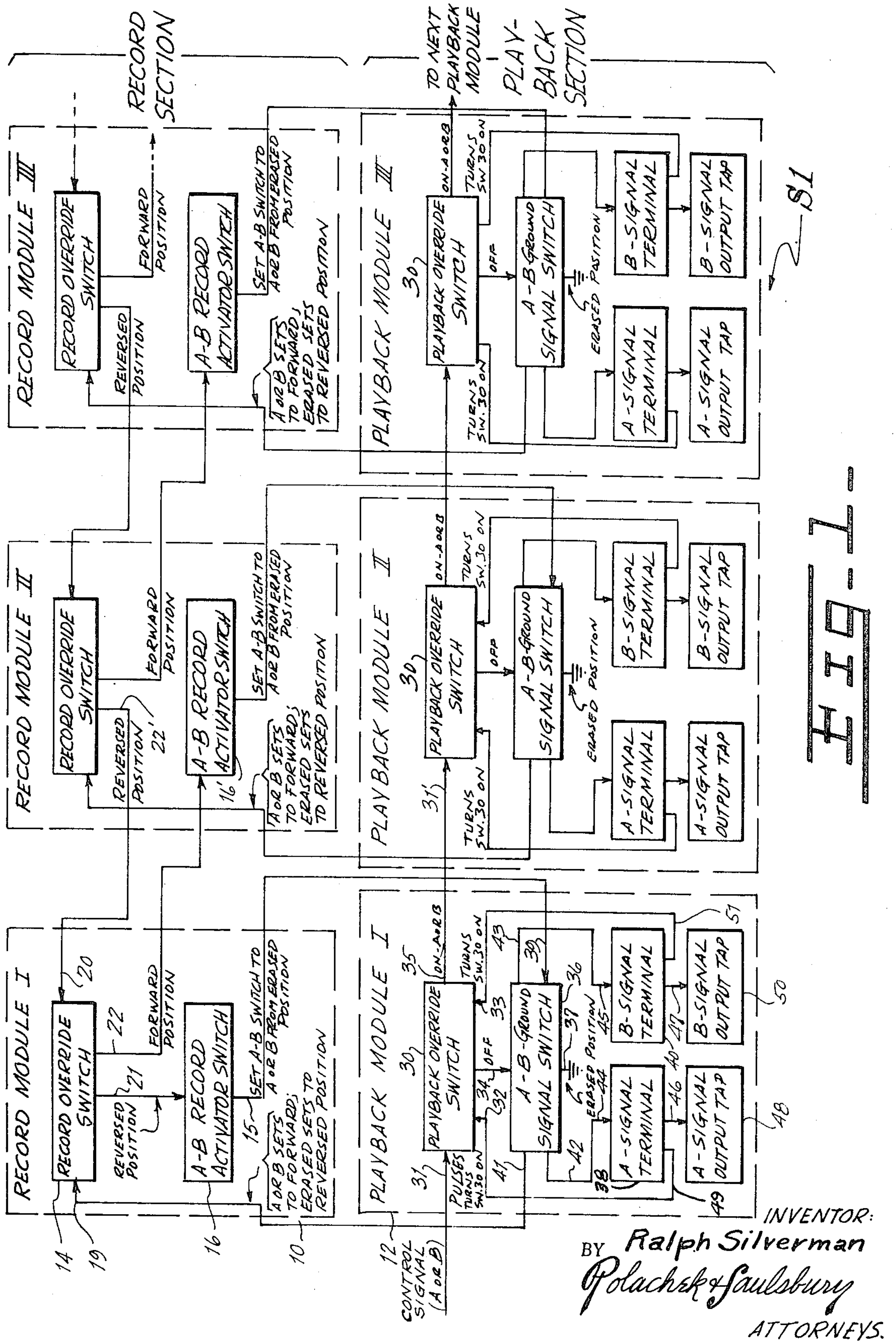

INVENTOR:
Ralph Silverman
BY Polachek & Saulsbury
ATTORNEYS.

INVENTOR.
Ralph Silverman
BY Polachek & Saulsbury
ATTORNEYS

RAPID SEQUENTIAL INFORMATION RECORD, STORAGE AND PLAYBACK SYSTEM

Present sequential playback systems involve the motion of imprinted tape over a zone sensitized to the imprints on the tape. The imprints originate a temporal sequence of signals in the sensitized zone as the tape passes by. Recording in such systems operates analogously. A sensitized tape is passed over a zone of temporally sequential signals. In its passage over this zone the tape picks up these signals in a sequence along its length. Both recording and playback modes of present systems employ mechanical motion to translate between a temporally sequential and a physically sequential set of signals.

In the present proposed system there are also translations between physically sequential and temporally sequential sets of signals, but in this system this translation is accomplished by the passage of an electric current through a series of electronic, non-mechanical switches. In playback the modules that contain the information are not emptied of information. In recording, the transcription of an input signal in a module is timed to proceed, at a suitable time, the triggering of a switch that shunts the next signal into the next module. This synchronization can be effected in any one of several ways. A specific signal can be contrived to trigger the module override switch; or the module override switch may be triggered automatically at a certain time after the signal input is fed into the module; or a mode of feedback can be contrived where each input signal can serve as both an imprint on a playback module and to trigger a switch that shunts the next signal to the next module.

In playback, the output of a signal from a playback module is timed to preceed at a suitable time the triggering of a mechanism that deactivates the played module and activates the next module in sequence. Analogously with recording, this synchronization between output from a module and the actuation of its module override mechanism may be triggered either by a specific signal, or automatically at a certain time after the module has been activated to play, or else by a mode of feedback where each output signal can serve to trigger the module bypass mechanism.

A major advantage of the present proposed system is speed. Primary memory imprinting and logic operations in known types of digital computers require much less time than it takes for tape to feed fast primary memory systems or to record conclusions. Thus prior secondary memory and conclusion writing methods are bottlenecks that prevent computer hardware from operating at full potential. The present proposed system may record and play back signals at unprecedented speed. The proposed playback system may be so fast as to require a governor.

Conventional tapes are often stored in libraries and moved onto playing and recording machines when needed. Unlike such tapes the proposed systems may feasibly (due to lack of moving parts) be stored in the same location where they are employed. This feature combined with the increased speed of these systems, renders possible instantaneous accessibility of a virtually unlimited domain of information. This capability is highly desirable for all aspects of the recording, storage and retrieval of written information.

Figure 2:
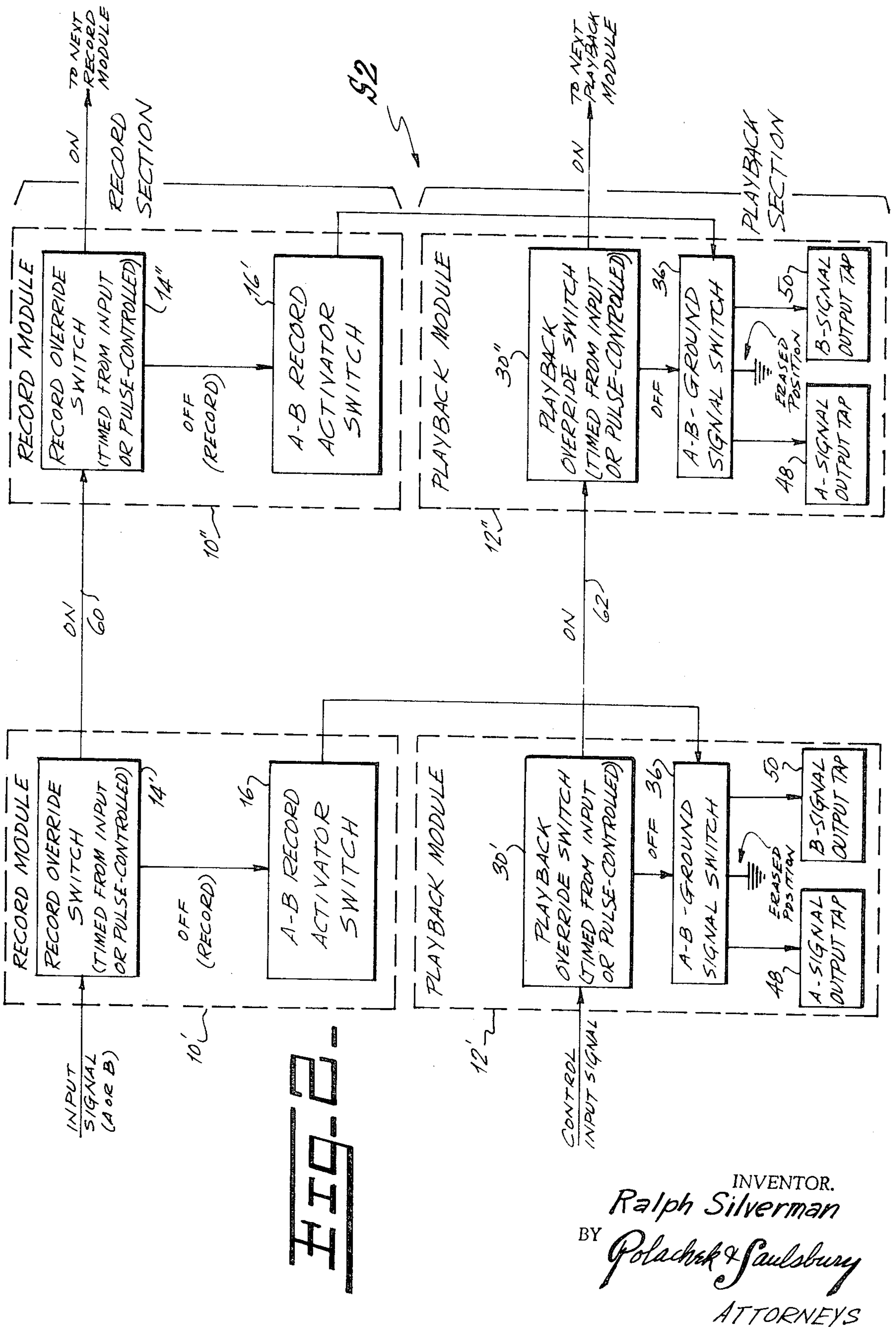

The invention will be explained in further detail in connection with the drawings in which FIGS. 1 and 2 are diagrams of two systems embodying the invention.

In the drawings which are block diagrams, solid lines represent flow paths of current or functional interconnections between various portions of systems, S1 and S2. In each system two distinguishable signals A and B can be handled, although the systems can be adapted for more than two signals. Each system includes record and playback sections and can be operated in record, playback and storage modes.

Referring first to FIG. 1, system S1 employs feedback of signals to trigger switches in the record and playback sections. The record and playback sections each include identical modules 10, 12. For each record module there is a corresponding associated playback module. The corresponding modules are designated "I," "II," "III" etc. respectively. In each record module 10 is a record override switch 14 and record activator switch 16. The override switch 14 has two inputs 19, 20 and two outputs 21, 22. The record activator switch has one input connected to reversed position output 21 of the override switch. Output 15 of the record activator is connected to a signal switch 36 in the associated playback module 12. The forward position output 22 of switch 14 is connected to the record activator switch 16′ of the next record module. The reversed position output 22′ of each record module following the first one is connected to input 20 of the override switch 14 of the preceding record module.

In each playback module 12 is a playback override switch 30 having three inputs 31, 32, 33 and two outputs 34, 35. The output 35 of each override switch 30 is connected to the data pulse signal input 31′ of the override switch in each succeeding playback module. Output 34 is normally off or open and is connected to the single input of a data signal storage device, in this case A–B signal switch 36. Input 32 applies a setting signal to the override switch 30 from A-signal terminal 38. Input 33 applies a setting signal from B-signal terminal 40.

Signal switch 36 has an input 39, three outputs 41, 42, 43 and an erased position 37. Output 41 is connected to input 19 of override switch 14. Output 42 is connected to input 44 of A-signal terminal 38. Output 43 is connected to input 45 of B-signal terminal 40. The A-signal terminal has an output 46 connected to A-signal output tap 48. Another output 49 of the A-signal terminal is connected to input 32 of override switch 30. Output terminal 47 of the B-signal terminal is connected to B-signal tap 50. Another output 51 of the B-signal terminal is connected to input 33 of the override switch 30.

OPERATION IN THE PLAYBACK MODE

Operation in each playback module 12 in the playback section of the system is substantially the same. Voltage or current signal input pulses enter the module at input 31 of the playback override switch 30 in the first playback module. Switch 30 is turned off at outlet 34. Hence the pulse is conveyed to the A-B signal switch 36 of module I. Signal switch 36 has been set to pass A or B signals by a signal received at input 39 from output 15 of the record activator 16. If signal switch 36 is set to A position, then the pulse proceeds to A-signal terminal 38 from output 42. If signal switch 36 is set to B position, the pulse proceeds to B-signal terminal 40 from output 43. Suppose switch 36 is set to A position, the pulse proceeds to A-signal terminal 38. Here the pulse is fed as a signal to A-signal output tap 48. The A-signal also appears at output 49 of the A-signal terminal and this is applied to override switch 30 which sets the switch to cut off at output 34 and triggers the switch to ON position at output 35 to pass the control current flow to input 31′ of the next playback module. When the next playback module II plays it triggers the next module III to play and is itself bypassed as was the first playback module I. The actuation of the override switches causes the pulses to bypass the A–B signal switches 36 in modules which have already been played, and to cause the pulses to pass to those playback modules in turn which have not yet been played.

A playback system as described can operate very fast. It may be too fast for the receiver which may be a conventional primary memory system in a computer. This possible problem can be solved by using three values in recording and playback so that a space will appear between significant signal; or by using a governor to test digestion of the signals by the receiver. The governor could control the power entering the playback section accordingly.

The A–B signal switch 36 in each playback module has a neutral (grounded) position 37 which constitutes the erased state of the module. The A- and B-signal terminals 38, 40 and output taps 48, 50 will be designed so that signals will be received before the module which originates the signal is bypassed.

OPERATION IN THE STORAGE MODE

The storage mode operates by preserving the signal storage settings of the A–B switches 36 in the playback modules. These settings are preserved in playback. The settings are lost only be a positive, deliberate erase operation.

OPERATION IN THE RECORD MODE

The record mode operates by switching the A–B signal switches 36 in each playback module to A or B position so that during playback, a signal will appear at the A- signal terminal 38 or B-signal terminal 40 of each playback module.

It will be noted that each playback module has a single record module associated with it in a 1:1 relation. Such a pair of modules will be designated herein as twin modules. The record module has two switches 14 and 16. Override switch 14 has two settings, forward and reverse. When the A–B signal switch 36 of a playback module is set either at A or B positions the override switch 14 in the record module of the twins is set at forward position. When the A–B signal switch in a playback module is set at erased position 37 then the override switch in its twin record module is set at reversed position.

Before recording is to take place all the A–B signal switches 36 in the playback modules must be set at neutral or erased position. This will cause all the override switches in the record modules to be switched to the reversed position. All signals entering the record system enter at input 20 and are shunted to the successive modules through override switches 14 set at reversed position. Input signals entering the record system at the initial input 20 are shunted to the preceding record module whose override switch 14 has a reversed setting.

Suppose the first record module and its successors are set in reversed position. The override switch 14 of the first record module (unlike its successors) shunts the incoming signal to the A–B record activator switch 16 in its own module when it is set in the reversed position. This activator switch sets the A–B signal switch 36 in playback module I, its twin, according to the nature of the input signal fed into the record system, to A or B from the erased setting. When the A–B signal switch 36 is thus changed from its erased setting, it switches the record override switch 14 in record module I to the forward position.

The next impulse entering the record section is shunted into record module I. The record override switch 14 in record module I is set to forward position so that the signal is shunted from there to the A–B record activator switch in record module II. The A–B record activator switch in record module II cause the A–B signal switch 36 in playback module II to switch from neutral to A or B depending on the nature of the incoming signal. This causes the override switch in record module II to be put in forward position. In this condition this switch shunts the next incoming signal to the A–B record activator switch in record module III, etc.

Suppose that playback modules I, II carry signals but that playback module III is erased. A record input would be shunted to the override switch of record module II. This switch would be in the forward position because playback module II is not erased. The impulse would be shunted to the A–B record activator switch of module III and would be recorded in playback module III.

The control input signals applied to the system must be discrete to distinguish positively between A and B signals. If necessary an extra signal can be interposed to provide a space signal. This would be necessary to provide a distinction between inadvertent long signals and repetitions.

While only discrete signal variations can be accommodated in the system as described, this limitation is unnecessary. It is possible to include in the A–B signal switch 36 of each record module, an element capable of recording a continuous scale by holding one of a continuously variable scale of energy saturations or wave forms. In playback the energy entering the module would be modified by the particular variable configuration of this element of the A–B signal switch. Such a variable could be an electrical resistance.

The override switches in the record and playback modules need not necessarily be triggered by the input or output of a signal as described in connection with system S2. They might be triggered automatically at suitable or at predetermined intervals of time. The override switches could be operated in normal record and playback operations by internal or external means which would turn the switches on at a given interval after they receive input energy from a preceeding override switch. The override switches could also be operated by receipt of special pulses which could be carried by the control current. Such a system which operates without feedback is shown in FIG. 2.

In system S2 of FIG. 2, parts corresponding in function to those of system S1 of FIG. 1 are identically numbered. The record override switches 14′, 14″ in successive record modules 10′, 10″ and the playback override switches 30′, 30″ in successive playback modules 12′, 12″ are pulse controlled. The timing pulses are applied by local or internal circuitry or by timing the signal or control inputs applied to the switches. This is a sequential information system. The arrangement of components in the system is similar to that of feedback system S1. The basic difference is that there is no feedback of signals to trigger successive override switches in the successive record and playback modules. All record modules 10′, 10″ are identical in construction and arrangement, and all playback modules 12′, 12″ are identical in construction and arrangement. Before the system is operated in recording or playback modes all override switches in the record or playback modules respectively are automatically turned off and then are automatically turned on by the timing pulses which appear at module outputs 60 or 62 in succession.

It should be understood that in addition to systems with feedback and without feedback in both recording and playback modes, it is also possible to devise systems with feedback recording and non-feedback playback, and systems with non-feedback recording and with feedback playback.

Although the systems described contemplate use of electrical impulses, it is possible to employ other energy sources, such as light pulses derived from lasers, sound pulses, etc.

The systems described can be used to record pictures and sounds as well as written or other graphic information. The crucial difference in the tasks is that the quality of picture and sound reproduction depends on rigid regulation of the rate of recording and playback. Such regulation can be provided by a governor employed in recording and playback. In recording such a governor would control the number of input signal units per unit of time. In playback a governor would regulate the number of output signals per unit of time by regulating the rate of energy input into the playback system.

The several switches described in connection with the several modules may be transistorized gates, multivibrators or other electronically active electronic devices containing no mechanical moving parts whatever. The terms "switch" and "-switches" are used herein in the general sense of devices which turn the flow of current or application of voltage, magnetic field or other energy state on and off without suggesting necessarily any moving mechanical parts.

What is claimed is:

1. Means for imprinting, storing and replaying recorded information, comprising a plurality of pairs of modules arranged in sequence, each pair of modules consisting of a record module and a playback module; each playback module comprising signal storage switch means, signal terminal means, playback override switch means, and signal output means; first circuit means connecting the playback override switch means of each playback module both to the signal storage switch means of the same playback module and to the playback override switch means of the next adjacent sequential playback module, second circuit means connecting the signal storage switch means in each playback module to the signal terminal means in the same playback module, and third circuit means connecting the signal terminal means in each playback module to the signal output means in the same playback module; each record module comprising record override switch means and record activator switch means, fourth circuit means connecting the record activator switch means in each record module to the signal storage switch means in the playback module of the same pair of modules, and fifth circuit means connecting the record override switch means of each record module both to the record activator switch means of the same record module and to the record override switch means of the next adjacent sequential record module.

2. Means for imprinting, storing and replaying recorded information as defined in claim 1, wherein the record override switch means in all record modules each has an input, a reversed position output and a forward position output, said fifth circuit means connecting the reversed position output of the record override switch in the first record module in said sequence to the record activator switch means in the same record module, and connecting the reversed position output of the record override switch means in all other record modules to the input of the record override switch means in the next preceding record module; and sixth circuit means connecting the forward position output of each record module to the record activator switch means in the next succeeding record module, whereby each signal input pulse serves to trigger the record override switch means of each record module to shunt the next information pulse to the next record module.

3. Means for imprinting, storing and replaying recorded information as defined by claim 1, wherein the signal storage switch means is a signal switch having different signal output positions and a neutral erased position, said signal terminal means comprising signal terminals connected to respective output positions of the signal switch, and said signal output means comprising signal output taps connected to the signal terminals respectively.

4. Means for imprinting, storing and replaying recorded information as defined by claim 1, wherein the record override switch means in the first record module has a reversed position output connected to the record activator switch means in the same module and a forward position connected to the record activator switch means; in the next sequential record module, whereby each signal input pulse serves both as an imprint stored in the signal storage switch means of the playback module and to trigger the record override switch means to shunt the next data pulse to the next record module.

5. Means for imprinting, storing and replaying recorded information as defined in claim 1, further comprising sixth circuit means connecting the signal terminal means in each playback module to the playback override switch means in the same playback module for resetting the playback override switch means therein, whereby data pulses applied to successive playback modules are shunted out partly as bits of information and partly as triggers for passing control input signals to the next succeeding playback modules.

6. Means for imprinting, storing and replaying recorded information as defined in claim 1, wherein all the switch means in all the modules comprise electronically active electronic components devoid of moving mechanical parts.

7. Means for imprinting, storing and replaying recorded information as defined by claim 1, further comprising sixth circuit means connecting the respective signal terminals in each playback module to the playback override switch means in the same playback module to trigger the same to pass either one of two different signals applied thereto.

8. Means for imprinting, storing and replaying recorded information as defined by claim 7, wherein the signal storage switch means in each playback module is connected to the record override switch means in the record module of the same pair of modules to set the record override switch means to forward or reversed positions.

* * * * *